United States Patent [19]

Takata et al.

[11] Patent Number: 5,171,071
[45] Date of Patent: Dec. 15, 1992

[54] BRAKE SYSTEM TO IMPROVE BRAKE PEDAL TRAVEL AND RESPONSE DURING ANTILOCK AND TRACTION CONTROL

[75] Inventors: Koji Takata; Tsuyoshi Fujimoto; Koichi Hashida, all of Hyogo, Japan

[73] Assignee: Sumitomo Electric Industries, Ltd., Osaka, Japan

[21] Appl. No.: 852,346

[22] Filed: Mar. 17, 1992

Related U.S. Application Data

[63] Continuation of Ser. No. 574,283, Aug. 28, 1990, abandoned.

[30] Foreign Application Priority Data

Aug. 29, 1989 [JP] Japan ................... 1-222177

[51] Int. Cl.$^5$ ................ B60T 8/34; B60T 8/42
[52] U.S. Cl. .................. 303/113.2; 303/111;
303/113 SS; 303/116 SP; 303/115 PP;
303/113.4; 303/116.2; 303/115.4
[58] Field of Search ...... 303/113 TR, 113 R, 113 SS,
303/113 AP, 115 PP, 111, DIG. 5, DIG. 6, 116
SP, 110, 93, 101

[56] References Cited

U.S. PATENT DOCUMENTS

| | | | |
|---|---|---|---|
| 4,578,951 | 4/1986 | Belart et al. | 303/114 X |
| 4,715,664 | 12/1987 | Nakanishi et al. | 303/110 X |
| 4,720,151 | 1/1988 | Belart et al. | 303/114 X |
| 4,743,075 | 5/1988 | Belart et al. | 303/110 X |
| 4,807,944 | 2/1989 | Weise | 303/110 X |
| 4,852,952 | 8/1989 | Kervagoret | 303/111 X |
| 4,950,028 | 8/1990 | Harrison | 303/113 TR |
| 4,967,866 | 11/1990 | Maehara | 180/197 |
| 4,971,400 | 11/1990 | Jonner | 303/113 TR |
| 4,971,403 | 11/1990 | Altmeppen et al. | 303/115 PP |
| 4,976,500 | 12/1990 | Cogswell, II et al. | 303/114 X |

FOREIGN PATENT DOCUMENTS

| | | | |
|---|---|---|---|
| 0160343 | 7/1986 | Japan | 303/111 |
| 0083243 | 4/1987 | Japan | 303/93 |

Primary Examiner—Robert J. Oberleitner
Assistant Examiner—Peter M. Poon
Attorney, Agent, or Firm—Wenderoth, Lind & Ponack

[57] ABSTRACT

A brake system has a manually controlled brake pressure generator, independent controlled brake circuits each having a wheel brake and a flow control valve for electronically controlling the pressure of the wheel brake, a dynamic pressure source necessary for the pressure control by the flow control valve, a reservoir, a sensor such as a wheel speed sensor, and an electronic control unit. A pair of check valves for introducing and returning fluid are provided in parallel to each other between an output circuit of the brake pressure generator and each controlled brake circuit. A solenoid changeover valve for antilock is provided between the output circuit of the brake pressure generator and the check valves for introducing fluid to close the line during antilock control.

10 Claims, 3 Drawing Sheets

BRAKE SYSTEM TO IMPROVE BRAKE PEDAL TRAVEL AND RESPONSE DURING ANTILOCK AND TRACTION CONTROL

This application is a continuation of now abandoned application Ser. No. 07/574,283, filed on Aug. 28, 1990.

BACKGROUND OF THE INVENTION

1. Field of the Invention

This invention relates to a brake system for a vehicle, which attains such objects as versatile and sophisticated control and improved pedal feel with a minimum number of parts.

2. State of the Prior Art

One typical example of prior art brake system capable of both antilock control and brake traction control is shown in FIG. 4 of U.S. Pat. 3,667,813.

Although this prior art publication mainly describes a control method, since the basic elements of this prior art are concisely shown in its FIG. 4, the present invention is conveniently compared with this figure. Therefore, this figure is reproduced as FIG. 2 of the present invention to describe the prior art.

In this prior art, the output of a brake fluid pressure generator 27, adjusted by manual control, is shut off by a solenoid valve 31. Instead, a dynamic pressure from a dynamic pressure source having a motor 24, a pump 25 and an accumulater 26 is introduced into a brake unit 20 through a solenoid valve 19, or pressure fluid therefrom is discharged into a reservoir 23 through a solenoid valve 30, to adjust the braking pressure.

Namely, three solenoid valves 31, 19 and 30, provided for each brake circuit, are controlled by commands from an electronic control unit to obtain a desired brake pressure irrespective of the manual control.

One problem of the prior art brake system shown in FIG. 2 is that once the solenoid valve 31 is shut off, the brake unit 20 is completely separated from the manual control, so that the system cannot quickly respond to changes of the intention of the driver. Namely, in this system, once the solenoid valve 31 is closed, the system is controlled to attain the maximum deceleration or acceleration irrespective of the intention of the driver until the change of the intention of the driver is transmitted to a brake switch 33, i.e. a pedal 28 is moved forward or backward to such an extent as to actuate the switch 33.

Of course, it is desirable to quickly reflect the change of the intention of the driver during antilock control or automatic brake control, such as traction control. The prior art brake system shown in FIG. 2 cannot meet this requirement.

To improve the pedal feel, it is necessary both to shorter the pedal stroke in normal conditions and to lighten the pedal force in case of failure of the dynamic pressure source. But the system arrangement shown in FIG. 2 cannot meet this requirement either.

SUMMARY OF THE INVENTION

It is an object of this invention to provide a brake system which obviates the above shortcomings and which is capable of reducing the braking force in accordance with the reduction of the pedal force even during antilock control, capable of increasing the braking force in accordance with the increase of the pedal force even during automatic brake control such as traction control, and capable of shortening the pedal stroke in normal conditions keeping a predetermined relationship between the pedal stroke and vehicle deceleration, with a minimum number of parts.

According to this invention, an electronically controllable pressure increase/decrease control means (flow control valve) is provided in each independent brake circuit. The control means is connected to an output circuit of a brake pressure generator, which is a manually-controlled pressure increase/decrease control means, rough a circuit network made up of solenoid changeover valves and check valves.

The circuit network comprises pairs of check valves for the introduction and return of fluid, each pair being allocated to a respective controlled brake circuit. One solenoid changeover valve for antilock is provided for all the check valves for fluid introduction and one solenoid changeover valve for automatic braking such as traction control is provided for all the check valves for fluid return.

With the brake system according to this invention, by the provision of the above-described circuit network, any change of the intention of the driver can be reflected instantly as a change in brake pressure during electronic pressure increase/decrease control (antilock control or automatic braking) and such a change of intention will thereafter appear as a change in the control stroke. By detecting such a change, the electronic pressure increase/decrease control can be stopped quickly without the need for detecting the manual control force.

For control of the shortening of the pedal stroke, it is preferable to provide a stroke sensor on the brake pedal or a member associated therewith. This sensor may be used to detect changes in the aforementioned control stroke, too.

If the output circuit of the brake pressure generator includes no controlled brake circuit for automatic brake control, no solenoid changeover valve for automatic braking has to be provided between the output circuit and the check valves for returning fluid.

In normal conditions, i.e. while neither the antilock control nor the automatic brake control such as traction control is being carried out, the flow control valves are actuated with the solenoid changeover valves kept deactivated (kept open) to introduce pressure fluid into the controlled brake circuits, from the dynamic pressure source (or to discharge it from the controlled brake circuits into the reservoir) so that the pedal stroke will be controlled in a predetermined relation with respect to deceleration. Namely, in normal conditions, the pedal stroke shortening control is carried out.

This will make it possible to reduce the effective sectional area of the piston of the static pressure generator and thus to lighten the pedal force during failure in the dynamic pressure source.

During antilock control, i.e. when a tendency toward excessive slip is detected, the solenoid changeover valves for antilock control will be actuated. If the output fluid pressure from the brake pressure generator is higher than the pressure in the controlled brake circuits when the solenoid changeover valves for antilock are actuated, the pressure in each of the controlled brake circuits is adjusted independently by the flow control valves in each circuit. But if the abovementioned output pressure gets lower than the pressure in the controlled brake circuits as a result of relaxation of the pedal force, the fluid in the controlled brake circuits will return to the output circuit through the check valves for fluid return, thus lowering the brake pressure to the level corresponding to the pedal force. When the tendency toward excessive slip disappears with the decrease in the brake pressure, the antilock control is stopped and the solenoid changeover valves for antilock are deactivated, and thus the system returns to the normal control mode. Namely, the braking force is reduced quickly in response to the relaxation of the pedal force.

During the automatic brake mode such as traction control, the solenoid changeover valves for automatic braking are actuated. The pressure in the controlled brake circuits is controlled by the flow control valves. If in this state the driver shows his intention to brake by depressing the pedal, the output pressure from the brake pressure generator will increase. When this output pressure exceeds the brake pressure in the controlled brake circuits (which is generated based on the automatic brake control), pressure fluid will flow from the brake pressure generator into the brake circuits through the check valves for introducing fluid to increase the brake pressure to the level corresponding to the pedal force. As a result, the wheels will show a braking behavior in response to a force corresponding to the pedal force. Thus, the automatic brake control will be stopped and the solenoid valves for automatic brake control will return to their inoperative position. Namely, even during automatic brake control such as traction control, once the driver shows his intention of braking, the braking force corresponding to the intention of the driver can be produced quickly.

BRIEF DESCRIPTION OF THE DRAWINGS

Other features and objects of the present invention will become apparent from the following description taken with reference to the accompanying drawings, in which.

DETAILS DESCRIPTION OF THE PREFERRED EMBODIMENTS

Figure 1:
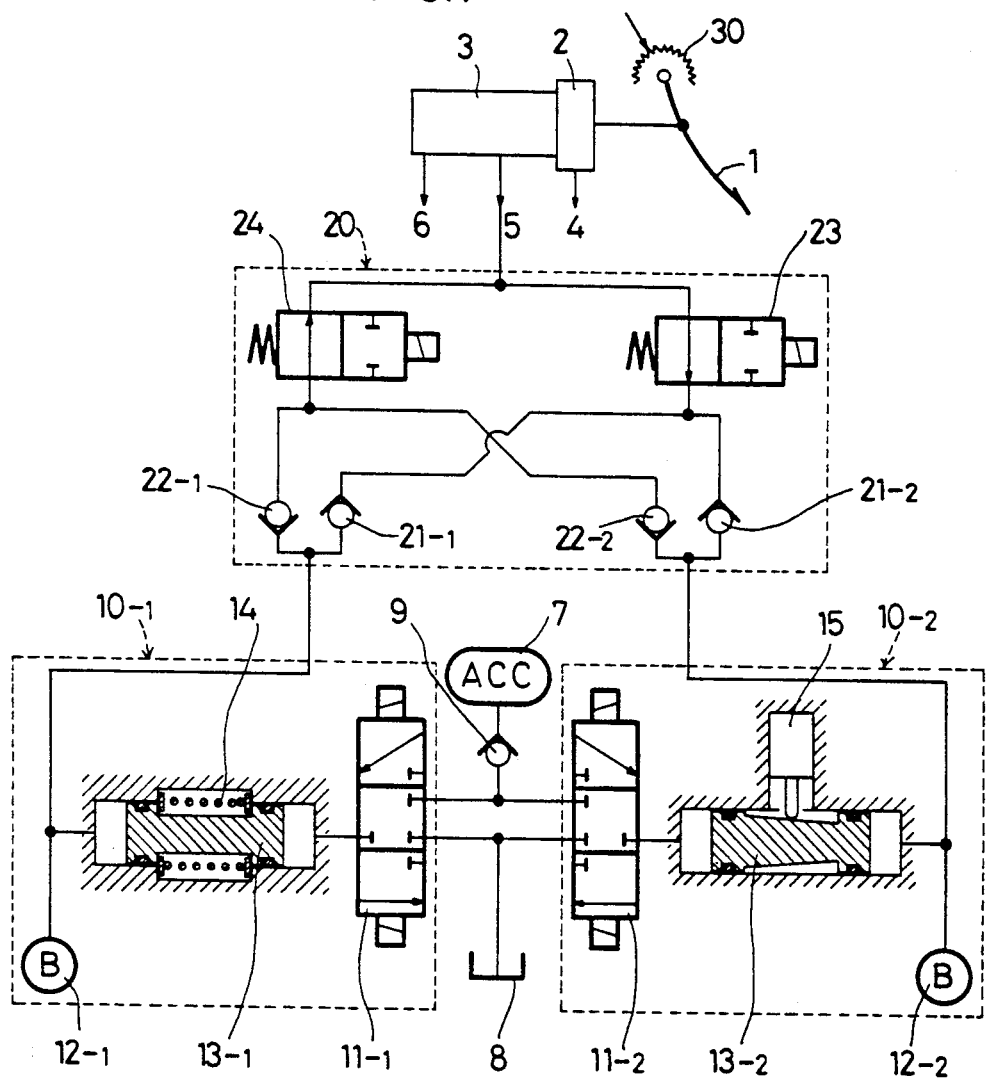
FIG. 1 is a circuit diagram of the embodiment of this invention.

Referring to FIG. 1, by controlling a pedal 1 manually, a brake fluid pressure is generated from brake pressure generators 2 and 3 (a booster 3 amplifies the pedal force and gives it to the master cylinder 2) to output circuits comprising a dynamic pressure line 4 and a static pressure line 5. A tandem master cylinder may be used to provide another static pressure line 6 in place of the dynamic pressure line 4. Also, the circuit may comprise the three lines 4–6. Since these circuits are controlled on the same principle, we shall describe the present invention for the output circuit 5 only. In the drawing, identical parts are represented by identical numerals followed by small numbers −1 and −2, but in the specification these small numbers are omitted at some places.

As shown in FIG. 1, one or more controlled brake circuits 10 belong to one output circuit 5. Each controlled brake circuit 10 comprises one normally closed flow control valve 11 and one or more wheel brakes 12 belonging to the valve 11.

The flow control valves 11 serve to open and close the lines between a dynamic pressure source 7 and a reservoir 8 and the respective circuits 10. By the action of the valves 11, the pressure fluid in the source 7 is admitted into the circuits 10, or the pressure fluid in the circuits 10 is discharged into the reservoir 8. Thus the fluid pressure of the brake 12 belonging to each controlled brake circuit 10 is electronically controlled.

The dynamic pressure source 7 and the reservoir 8 may have some of their elements shared with the brake pressure generators 2 and 3. Also, as with the prior art brake system shown in FIG. 2, the flow control valve may be a combination of two solenoid valves or a more sophisticated flow-variable control valve.

In the embodiment shown in FIG. 1, two controlled brake circuits 10-1 and 10-2 having wheel brakes 12-1 and 12-2, respectively, are connected to a single output circuit 5. A circuit network 20, which is a characterizing feature of the present invention, is provided between the output circuit 5 of the brake pressure generator and the controlled brake circuits 10.

This circuit network 20 comprises check valves 21-1 and 21-2 for introducing fluid and check valves 22-1 and 22-2 for returning fluid, one of each for each of the respective controlled brake circuits 10, a solenoid changeover valve 23 for antilock control located upstream of the check valves 21 for introducing fluid and a solenoid changeover valve 24 for automatic brake control, such as traction control, located upstream of the check valves 22. One pair of the valves 23 and 24 is provided for each output circuit.

A stroke sensor 30 for use in the control for shortening of the pedal stroke is provided on a brake pedal 1 or a member associated therewith. A wheel speed sensor 31 (FIG. 2) is also provided.

Figure 2:
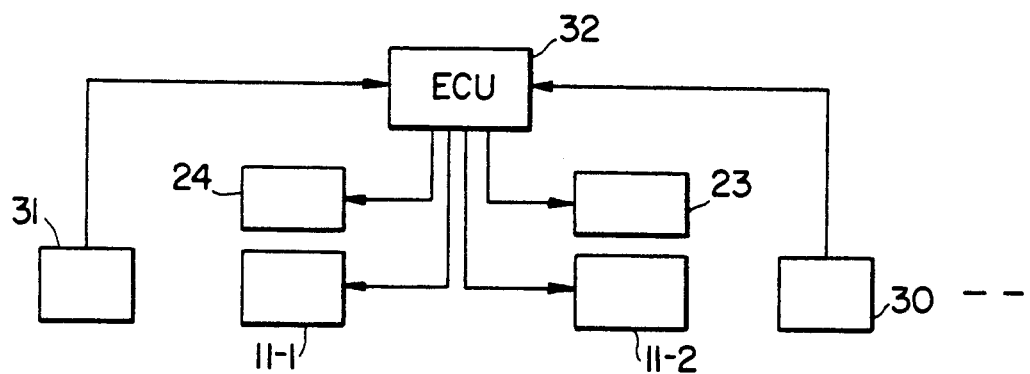
FIG. 2 is a block diagram of an electronic control system of the present invention.
Figure 3:
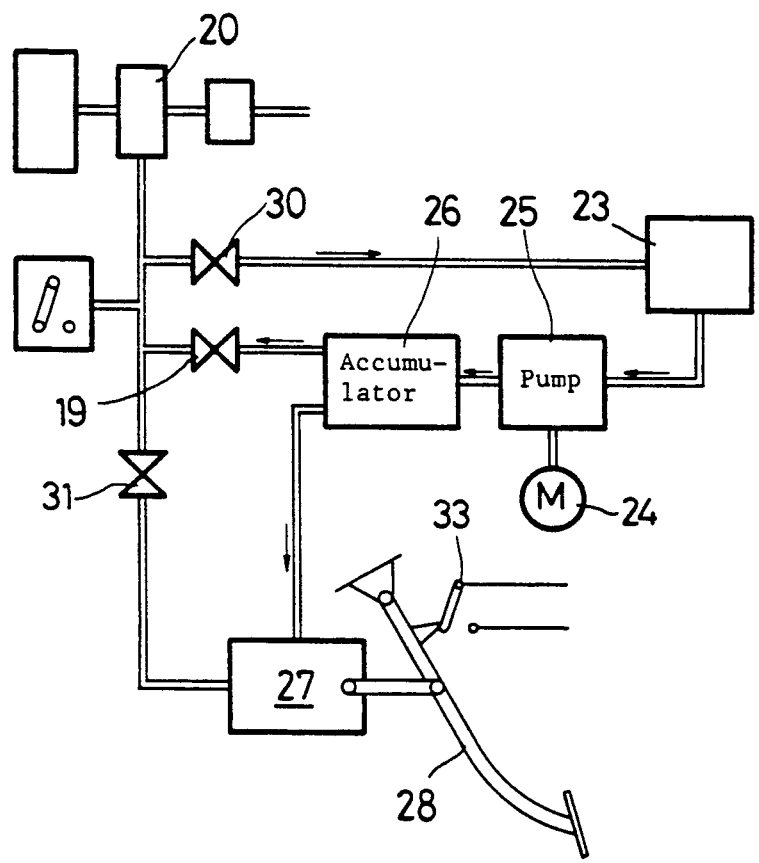
FIG. 3 is a block diagram of a prior art brake system.

As shown in the FIG. 2, these flow control valves, solenoid changeover valves and sensors (only some of them are shown) are all connected to an electronic control unit (ECU) 32.

Next, the operation of the brake system according to this invention will be described.

While the solenoid valves 23 and 24 are deactivated, the output circuit 5 communicates with the controlled brake circuits 10 through the check valves 21 and 22 arranged in parallel with and in opposite working direction to each other. In this state, when a dynamic pressure is introduced from the pressure source 7 through the flow control valves 11 belonging to the static pressure brake circuits, the pedal stroke will be shortened. Thus, by controlling the flow control valves 11 in such a manner that the pedal stroke and the deceleration are in a predetermined relationship with each other, the pedal stroke can be shortened while keeping a desired relationship with respect to the deceleration.

When the solenoid changeover valve 23 for antilock control is activated, the introducing side of the circuit network is shut off by the valve 23 and if the output pressure of the brake pressure generator is higher than the pressure in the controlled brake circuits, the return side, too, is shut off by the valves 22. Further, since the check valves 21 are provided between the controlled brake circuits 10-1 and 10-2 in opposite ways to each other, the controlled brake circuits are also out of communication with each other. Thus each controlled take circuit is controlled independently by the respective flow control valve 11.

On the other hand, if the output pressure of the brake pressure generator gets lower than the pressure in the controlled brake circuits due to the relaxation of the pedal force, pressure fluid is returned through the valves 22 and thus the brake pressure drops to the level of the output pressure of the brake pressure generator.

When the tendency toward excessive slip disappears from all the controlled brake circuits as a result of the reduction in the braking pressure, the solenoid changeover valves for antilock will be deactivated so that the system will return to the normal stroke shortening control. But if the pedal force is relaxed to a medium degree while the vehicle is running on what is called a split road surface, the tendency toward excessive slip might not disappear from the wheels on the low-$\mu$ road surface in spite of the fact that the brake pressure has dropped to a level corresponding to the pedal force. In other words, they should remain under the antilock control. On the other hand, such an excessive slip tendency will disappear from the wheels on the high-$\mu$ road surface. In such a case, it is necessary to keep the solenoid changeover valves for antilock activated in order to maintain the antilock control for the wheels on the low-$\mu$ road. On the other hand, if the antilock control is kept for the wheels on the high-$\mu$ road, the dynamic pressure will keep flowing through the flow control valves because these wheels are not showing a tendency toward excessive slippage. The dynamic pressure will then flow into the brake pressure generator and push the pedal backward. In order to prevent an excessive pedal pushback, it is preferable to provide a special control pattern to stop the flow of fluid through the flow control valves for at least a predetermined period of time when the pushing back of the pedal is detected and thereafter to allow only a moderate introduction of fluid. This is because, in an ordinary antilock control pattern (which is applied when the controlled brake pressure is lower than the output pressure), when the tendency toward excessive slippage disappears, the pressure in the controlled brake circuits is increased at a relatively quick rate until it reaches the output pressure corresponding to the pedal force, watching the possible occurrence of another tendency toward excessive slippage. This relatively quick rate is necessary to be prepared for the possible transition from low-$\mu$ road to high-$\mu$ road in the case of normal antilock control.

When the solenoid valve 24 is activated during automatic braking such as traction control, the return side will be shut off by it. If the pressure of the controlled brake circuits is higher than the output pressure of the brake pressure generator, the introduction side, too, is shut off by the valves 21. Further, due to the fact that the two check valves 22 are provided between the controlled brake circuits 10-1 and 10-2 in series and in opposite ways to each other, the communication between these controlled brake circuits 10 is closed, too. Thus the controlled brake circuits are controlled independently of each other by the respective flow control valve 11.

When the pedal force increases and thus the output pressure of the brake pressure generator becomes higher than the pressure of the controlled brake circuits 10, pressure fluid is introduced through the valves 21, increasing the brake pressure to the level of the output pressure of the brake pressure generator. Thus the pedal will be more or less pushed in. In response, the control will be stopped outright, in case it is a traction control, thus deactivating the solenoid changeover valves for automatic brake control. Thus the system can return to the normal stroke shortening control. In case of automatic brake control of a different type, it is possible to take interim measures depending upon the type of control.

It will be apparent from the above description that the solenoid changeover valve 24 is not an essential part if an output circuit includes no controlled brake circuits which should carry out automatic braking such as traction control, but it is essential to provide both the check valves 21 and 22 if there are provided a plurality of controlled brake circuits.

In applying the present invention to a static pressure line, because it is not desirable to allow the fluid from the static pressure generator to be mixed with the fluid from the dynamic pressure source, driving pistons 13 should preferably be provided between the respective brakes 12 and the flow control valves 11 to allow only the transmission of pressure therebetween while preventing fluid communication. No such consideration is necessary with a dynamic pressure line. Thus when applying the present invention to a dynamic pressure line such as the output circuit 4 in FIG. 1, the driving pistons 13 can be omitted.

If the driving pistons 13 are used, they should be of a two-way type, and it is necessary to provide means for returning them to their respective neutral positions during a non-control phase. Such means may be a return spring 14 mounted on the two-way driving piston 13-1 to force the piston automatically to return to its neutral position when the pressure difference at both ends thereof becomes small. Or else, as with the driving piston 13-2, a stroke sensor 15 may be provided on the piston to detect its neutral position and control the fluid pressure by using the flow control valve 11-2 to return the piston to the neutral position.

Further, in applying the present invention to a static pressure line, a check valve 9 may be provided to prevent a backflow when the manual control force increases above the pressure from the dynamic pressure source.

In the preferred embodiment, two controlled brake circuits are provided for each brake pressure generator and one wheel brake is provided for each controlled brake circuit. But one or three or more controlled brake circuits may be provided for an output circuit. Also, two or more wheel brakes may be provided for a controlled brake circuit.

In normal conditions, the pedal stroke may be shortened by comparing the pedal stroke with the deceleration of the vehicle. If the driving pistons 13 and their stroke sensors 15 are provided, the pedal stroke may be shortened by controlling the relation between the stroke of the driving piston and the deceleration, between the stroke of the driving pistons and the pedal stroke, or between the stroke of driving pistons and the manual control force or the fluid pressure proportional thereto (a pressure sensor is necessary in this case) in a predetermined manner.

What is claimed is:
1. A brake system for a vehicle, comprising:
a manually controlled brake pressure generator for generating hydraulic brake pressure;
an output circuit connected to said manually controlled brake pressure generator;
a plurality of independently controlled brake circuits connected to said output circuit, each said controlled brake circuit having a wheel brake and a flow control valve means connected thereto for electronically controlling the hydraulic pressure in said wheel brake, and flow control valve means being connected to a dynamic hydraulic pressure source and a hydraulic fluid reservoir; a sensor means for detecting the rotational speed of the wheels of the vehicle;

an electronic control unit connected to said sensor means for controlling said flow control valve means;

said output circuit having a plurality of first check valve means connected thereto for introducing fluid from said output circuit to said respective controlled brake circuits, a plurality of second check valve means connected thereto for returning fluid from said respective controlled brake circuits to said output circuit and a solenoid changeover valve means hydraulically operably disposed between said output circuit and said plurality of first check valve means controlled by said electronic control unit for closing off fluid communication between said output circuit and said first check valve means during antilock control.

2. The brake system of claim 1, wherein:
a second solenoid changeover valve means is disposed between said output circuit and said plurality of second check valve means and controlled by said electronic control unit for closing off fluid communication between said output circuit and said plurality of second check valve means during automatic braking.

3. The brake system of claim 2, wherein:
each said controlled brake circuit belongs to a static pressure output circuit and has a two-way piston disposed between said controlled brake circuit and said flow control valve means for transmitting fluid pressure therebetween, whereby said static pressure output circuit and said dynamic pressure circuit are prevented from having a direct hydraulic fluid communication with each other.

4. The brake system of claim 2, and further comprising a sensor means for detecting the amount of a manual control stroke of said manually controlled brake pressure generator connected to said electronic control unit for controlling said flow control valve means such that the manual control stroke is in a predetermined relationship with the deceleration of the vehicle.

5. The brake system of claim 4, wherein said electronic control unit discontinues one of antilock control and automatic brake control when one of a retraction and an advance of said manually controlled brake pressure generator is detected during one of antilock control and automatic braking control.

6. The brake system of claim 4, wherein said sensor means detects a retreat of said manually controlled brake pressure generator during antilock control, said electronic control unit restricts the rate of hydraulic pressure rise of said controlled brake circuit to a lower rate than in normal antilock control if the wheel belonging to said controlled brake circuit does not show any tendency towards excessive slippage, and stops antilock control of said output circuit and opens the solenoid changeover valve means of said output circuit if all wheels belonging to said output circuit do not show any tendency towards excessive slippage.

7. The brake system of claim 1, wherein:
each said controlled brake circuit belongs to a static pressure output circuit and has a two-way piston disposed between said controlled brake circuit and said flow control valve means for transmitting fluid pressure therebetween, whereby said static pressure output circuit and said dynamic pressure circuit are prevented from having direct hydraulic fluid communication with each other.

8. The brake system of claim 1, and further comprising a sensor means for detecting the amount of a manual control stroke of said manually controlled brake pressure generator connected to said electronic control unit for controlling said flow control valve means such that the manual control stroke is in a predetermined relationship with the deceleration of the vehicle.

9. The brake system of claim 8, wherein said electronic control unit discontinues one of antilock control and automatic brake control when one of a retraction and an advance of said manually controlled brake pressure generator is detected during one of antilock control and automatic braking control.

10. The brake system of claim 8, wherein said sensor means detects a retreat of said manually controlled brake pressure generator during antilock control said electronic control unit restricts the rate of hydraulic pressure rise of said controlled brake circuit to a lower rate than in normal antilock control if the wheel belonging to said controlled brake circuit does not show any tendency towards excessive slippage, and stops antilock control of said output circuit and opens the solenoid changeover valve means of said output circuit if all wheels belonging to said output circuit do not show any tendency towards excessive slippage.

* * * * *